(12) United States Patent
Peterson et al.

(10) Patent No.: US 11,164,349 B2
(45) Date of Patent: Nov. 2, 2021

(54) VISUALIZING A TIME SERIES RELATION

(71) Applicant: SAP SE, Walldorf (DE)

(72) Inventors: Sven Peterson, Berlin (DE); Linda Jahn, Munich (DE); Janick Frasch, Mannheim (DE); Ralf Schoenfeld, Tettnang (DE); Florian Weigold, Bensheim (DE); Alexandru Radu, Com. Paulesti (RO); Jan Gottweiss, Mosbach (DE); Ralf Vath, Tauberbischofsheim (DE); Axel Kuhle, Munich (DE); Lukas Brinkmann, Walldorf (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 17/077,387

(22) Filed: Oct. 22, 2020

(65) Prior Publication Data

US 2021/0174563 A1 Jun. 10, 2021

(30) Foreign Application Priority Data

Dec. 10, 2019 (EP) .................................. 19214755

(51) Int. Cl.
*G06T 11/20* (2006.01)
*G06F 16/904* (2019.01)
*G06F 3/0482* (2013.01)

(52) U.S. Cl.
CPC .......... *G06T 11/206* (2013.01); *G06F 16/904* (2019.01); *G06F 3/0482* (2013.01); *G06F 2203/04806* (2013.01); *G06T 2200/24* (2013.01)

(58) Field of Classification Search
CPC ............... G06T 11/206; G06T 2200/24; G06F 16/904; G06F 16/954; G06F 16/957; G06F 3/0482; G06F 2203/04806
See application file for complete search history.

(56) References Cited

U.S. PATENT DOCUMENTS 9,836,183 B1* 12/2017 Love ................... G06F 16/9024
2015/0347528 A1* 12/2015 Jugel ................. G06F 16/24535
707/759

(Continued)

FOREIGN PATENT DOCUMENTS

EP 3462417 A1 4/2019
WO 2017192184 A1 11/2017

OTHER PUBLICATIONS

"Extended European Search Report", dated May 13, 2020 (dated May 15, 2020), European patent Office, for European Application No. 19214755.1-1222, 9pgs.

*Primary Examiner* — Michelle L Sams

(74) *Attorney, Agent, or Firm* — Buckley, Maschoff & Talwalkar LLC

(57) ABSTRACT

Visualization of time series data includes sending to the data source a request for visualizing sensor data within a canvas having a width of w pixels and covering a visualization time range, each pixel of the canvas being representative of a time duration $I_{opt}$, receiving consecutive sets of tuples that each covers a time interval having the time duration $I_r$, performing a M4 aggregation comprising generating, from the received tuples, a set of consecutive w groups, each group of the w groups comprising tuples covering a time interval having the time duration $I_{opt}$, and determining for each group of the w groups a set of aggregates, and displaying the w sets of aggregates on the canvas of the browser window as a chart, wherein each one of the sets of aggregates is displayed in one of pixel columns of the canvas.

15 Claims, 7 Drawing Sheets

(56) References Cited

U.S. PATENT DOCUMENTS

2017/0220672 A1   8/2017  Sainani et al.
2018/0373756 A1  12/2018  Madala
2019/0102436 A1   4/2019  Bishnoi et al.

* cited by examiner

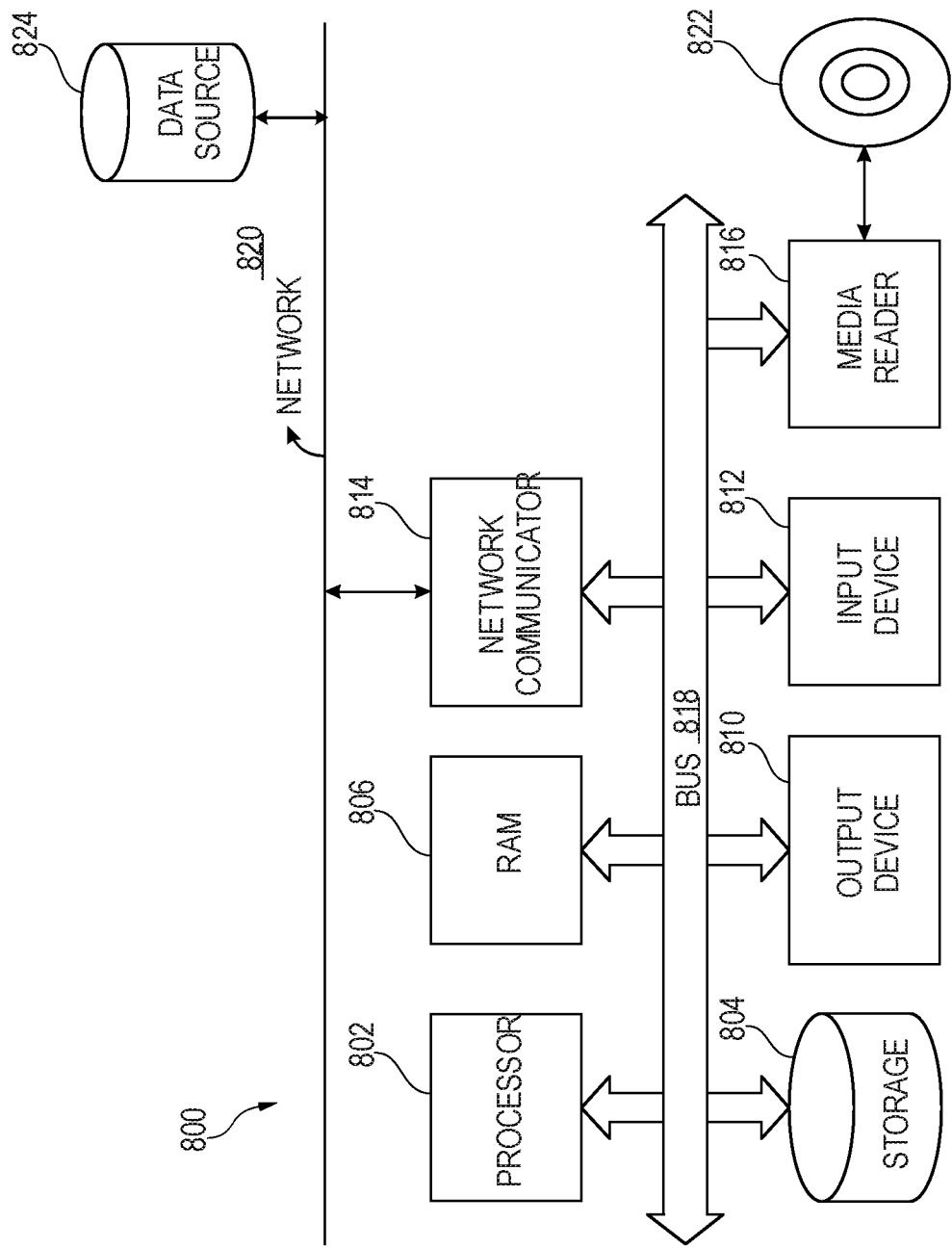

VISUALIZING A TIME SERIES RELATION

CROSS-REFERENCE TO RELATED APPLICATIONS

The present application claims priority to EP Application No. 19214755.1, filed Dec. 10, 2019, the contents of which are incorporated herein in their entirety for all purposes.

BACKGROUND

Petabytes of data are being gathered in public and private clouds, with time series data originating from various sources, including sensor networks, smart grids, financial markets, etc. Large volumes of collected time series data are subsequently stored in relational databases. Relational databases, in turn, may be used as backend by visual data analysis tools. Data analysts interact with the visualizations and their actions are transformed into a series of queries that are issued against the relational database, holding the original time series data. However, the issued queries may produce a large result set.

Uwe Jugel et al., "Proceedings of the VLDB Endowment, Volume 7 Issue 10, June 2014, pages 797-808," discloses a visualization-oriented time series data aggregation, named M4 aggregation or M4 algorithm herein. The M4 aggregation receives as input time series data, a number of pixels, and a time interval represented by the width of the pixel. The M4 aggregation determines for each time bin, within a time range, a set of four tuples. The four tuples comprise the minimum value, maximum value, first value, and last value acquired during the time bin. The M4 aggregation is performed by rewriting existing queries to the data sources so that the rewritten queries produce a much smaller result set, without impairing the resulting visualization.

BRIEF DESCRIPTION OF THE DRAWINGS

FIG. 8 is a block diagram of an exemplary computer system for implementing at least part of the present method.

Like reference symbols in the various drawings indicate like elements.

DETAILED DESCRIPTION

Figure 1:
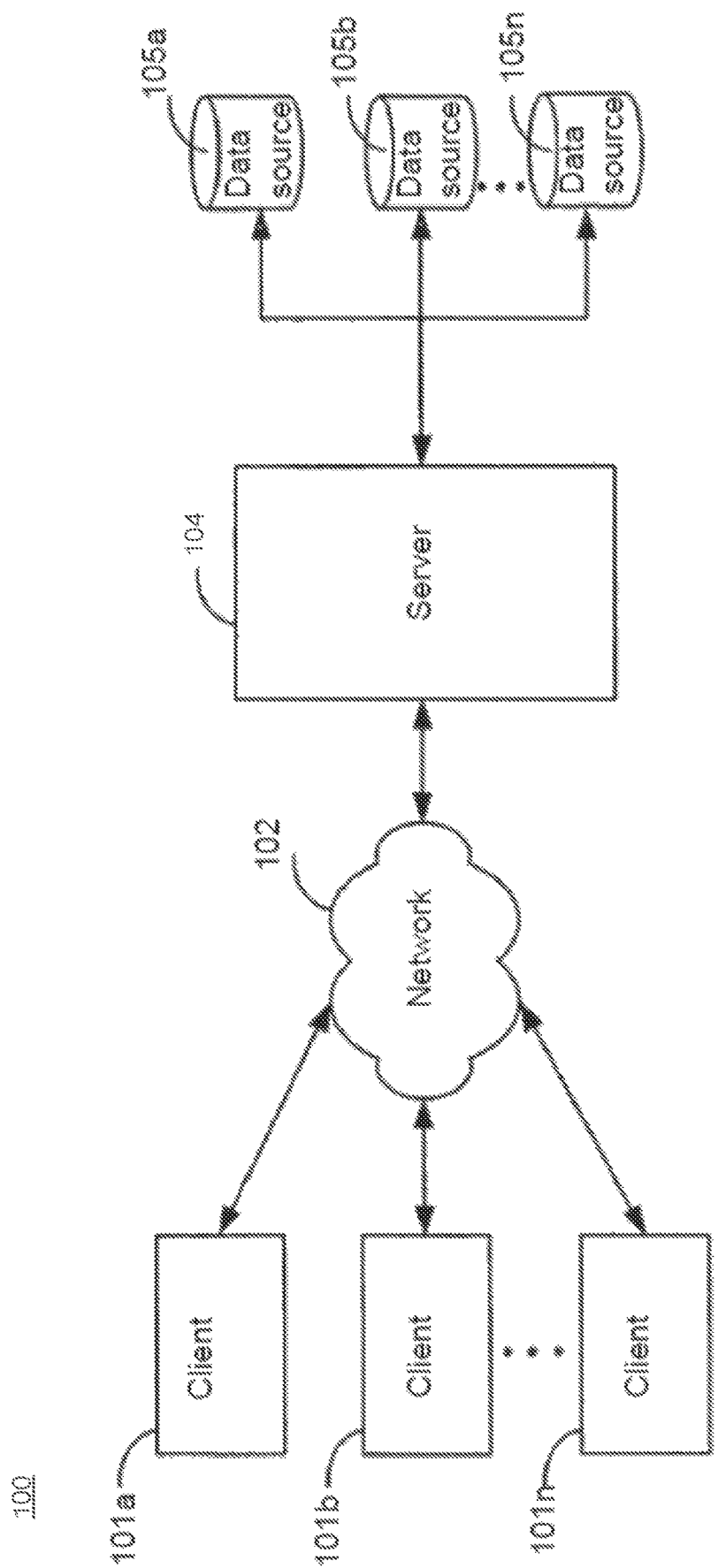
FIG. 1 depicts a schematic block diagram of a computer system in accordance with an example of the present subject matter.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Data visualization is the graphic representation of data. This process may involve a number of stages. These include, for example, data production and data access. The optimization of these stages may go hand in hand. In particular, optimal data production may influence the data access and optimal data access may enable flexible data production. The present subject matter provides the at least one data source for optimizing data production.

The at least one data source may comprise one data source. In another example, the at least one data source may comprise multiple data sources. The at least one data source may be a selected one or more of a plurality of data sources. The at least one data source may be configured to provide a same type of data e.g. the at least one data source may provide data for multiple things (of internet of things or IoT) that are instances of one or more thing types. Using a single data source may enable an efficient use of the network bandwidth allocated to a user of the internet browser compared with the case where the bandwidth is shared among multiple data sources. Using multiple data sources that provide the same type of data may increase the volume of the analysis sample. This may increase the user satisfaction and thus may reduce (further) requests of data over the network.

The data source may be a computer system. The data source is configured to transfer data over a network. The data source may, for example, be a public or private cloud storage system, a storage system that is addressable via a URL over a network, or any other accessible data source. The data source may comprise data for one or more sensors. The sensor may be a device, module, machine, or subsystem whose purpose is to detect events or changes in its environment. The sensor may collect or acquire measurements at regular or irregular time intervals. The measurements may be provided as a time series relation. The time series relation is a time series. The time series relation comprises a series of data points (or values) indexed (or listed or graphed) in time order, e.g., the time series relation comprises tuples of values and associated timestamps. A timestamp of a value (or data point) indicates the time at which the value is acquired. The time series relation may comprise raw data (or non-preprocessed data in accordance with the present subject matter).

The time series relation may be stored in a database and/or a system of databases of the data source. This may result in a large amount of data being stored in these databases. Access to such databases may thus lead to very high bandwidth consumption. Access to the large amount of raw measurements stored in such databases may lead to a high bandwidth consumption and can cause a high load on the database system as well as the requesting client. The present subject matter may solve this issue by preprocessing data stored in the databases. The preprocessing enables creation of the tuples. This may be advantageous, as the tuples may reduce the bandwidth consumption while still capturing the major characteristics, required for an accurate visual representation of the measurements in the associated acquisition time interval. Instead of using many values per time interval at most four values may be used per time interval. This may save processing resources. Storage resources may be saved, e.g., by replacing the content of the database with the created tuples. Replacing the content of the database may, for example, comprise deleting the content of the database or archiving the content of the database.

The time series data may, for example, be preprocessed and provided automatically e.g. the preprocessing may automatically be performed upon the reception/acquisition of new time series data. This may save processing resources at the data source. For example, instead of preprocessing the same time series data multiple times upon request, the present method provides the preprocessed tuples so that the users can query them without having to query the time series data.

Reducing the amount of data may optimize data access as described above. However, the preprocessed tuples may enable to further optimize access to data if the tuples are produced for an optimal set of determined time intervals. For that, the present subject matter may optimize the determination of the distinct time durations $I_t$. The distinct time durations $I_t$ may for example be user defined, e.g., by an administrator of the data source. For example, the method may comprise receiving a user input, wherein the user input comprises the distinct time durations. Using user-defined time durations may save processing resources. For example, the administrator may know which time intervals are going to be used for visualization and thus resources required for processing candidates (attempted) time intervals may be saved. For example, another user, who does not know visualization details on the client side, may define any type of time durations. This may cost extra resources, as the response efficiency may be lower, requiring more attempts in order to determine the right choice of $I_{opt}$. In another example, the distinct time durations may automatically be determined by the data source. For example, the data source may determine the time range covered by the data stored in the database and may split (per time units e.g., hour, minute, etc.) that time range to determine the distinct time durations. This may enable an autonomous operation of the data source and may speed up the execution of the present method.

In addition, by providing different time durations, the width of individual pixels of the canvas may represent different time durations. The individual pixels may be in the x-axis of an x-y graph. The different time durations are provided so that the granularity of the tuples matches the time duration that can be represented by an individual pixel (e.g., an individual pixel represents a time duration of 1 hour and the time durations comprise at least one duration less than or equal to 1 hour). A pixel column may comprise pixels having the same position in the x-axis. In one example, an initial time duration that is represented by individual pixels of the canvas may be provided. And based on the different zoom levels allowed by the browser window, all possible time durations that can be represented by the individual pixels may be determined. These all possible time durations may be the determined distinct time durations $I_t$. This may enable accurate and efficient access to the preprocessed data. The access may be efficient in that most of the queries may be satisfied. This may be advantageous particularly in cases that involve monitoring the time series data. The monitoring may be performed by a team of users. The monitoring may comprise comparing the behaviour of time series data with reference values to identify an anomaly in data. In this example, predefined charts may be used with a fixed initial time duration. This example may enable the users to perform zooms on the predefined charts with a predefined/limited number of zoom levels. Each zoom level may cause a predefined change in the initial time duration. Thus, by choosing the time durations $I_t$ based on this knowledge of the changes caused by the zoom levels, an efficient access to pre-processed data may be enabled.

The access to data may be simplified, e.g., a user may perform simplified queries for getting the tuples. This may further be advantageous for the following reasons: The access to the time series of the database of the data source may require complex queries. However, writing complex queries may be error prone and resulting erroneous queries may lead to unnecessary processing and transmission of data. With the present subject matter, the data is preprocessed so that the querying of the preprocessed tuples is simplified, e.g., the user may need to specify only a few inputs such as the data source and the time range he or she wanted to visualize. Thus, the present subject matter may save the network bandwidth while still enabling accurate and simplified querying of data. For example, the present subject matter enables a user to query the created tuples instead of querying the whole time series relation. In other words, this may enable a user to query specific tuples of a timeseries relation, e.g., only tuples where t is within a specified time box can be retrieved.

In order to further optimize access to the data, the present subject matter may optimize data access at the side of client systems. The present subject matter may provide a client system comprising an application that is configured to fetch information from the data source and display it on a user's device. The application may, for example, run the internet browser and may be configured to access the preprocessed data at the data source using the internet browser. Using the internet browser may enable a seamless integration of the present subject matter with existing systems, e.g., the present method may make use of most computer systems as they are equipped with internet browsers. In addition, the data communication using the internet browser may be secured using pre-installed data communication security features of the internet browsers.

The internet browser may select or identify one of the determined time durations using the time duration $I_{opt}$. The selection may be performed using a predefined selection criterion. The selection criterion may require, for example, that the selected time duration is the longest time duration $I_{max}$ of the determined time durations $I_t$ that is smaller than or equal to the time duration $I_{opt}$. Using the longest time duration $I_{max}$ of the determined time durations $I_t$ that is smaller than or equal to the time duration $I_{opt}$ may be advantageous, because same tuples can be used for intervals having durations $I_{max}$ and $I_{opt}$, e.g., if $I_{opt}=2$ min and $I_{max}=1.8$ min the two intervals [0, 2] and [0, 1.8] may share at least the first value acquired during the two time intervals and the probability that they have the same minimum and maximum values is high. This may enable the displayed sets of aggregates to accurately represent the data of the respective time intervals. Accurately representing the data may save processing resources that would otherwise be required for repeated user attempts to update the displayed data if that is not accurate enough.

In another example, the selection criterion may require that the selected time duration is equal to the time duration $I_{opt}$. This may save processing resources compared with other matching criteria, e.g., the above-mentioned selection criterion of $I_{max}$ may require more processing resources than searching for an exact match. Finding the exact match may particularly be advantageous in case the time durations $I_t$ are determined by the same user i.e. the user defines the time durations that he or she is willing to look at in the line chart.

The M4 aggregation is configured in accordance with the present subject matter so that it can process locally, at the internet browser, tuples that are obtained from the data source. Performing the M4 aggregation on the pre-calculated aggregates from the data source may further reduce the amount of data for rendering (displaying) the actual line chart. In particular, the calculations necessary for the M4 aggregation may be more efficient and cheaper than rendering a large amount of data points. Processing the tuples locally for performing the display may be advantageous as it may enable a controlled processing and displaying of data by the user. For example, the user may be able to configure locally the M4 aggregation, e.g., by changing the number of tuples used as input to the M4 aggregation, without having to do network requests each time the user needs a change or configuration of the M4 aggregation. This may save processing resources such as network bandwidth. This may further be advantageous in case of multiple data sources, as the M4 aggregation is performed centrally at once instead of on each data source of the data sources.

The displayed aggregates may enable a lossless line chart visualization of sensor data. The line chart displays a series of the aggregates connected by straight line segments. The aggregates may be ordered by their x-axis values and joined with straight line segments.

According to one embodiment, the identifying of the longest time duration $I_{max}$ comprises: receiving by the data source an information request of time durations from the internet browser, upon receiving the information request, sending by the data source information indicative of the determined time durations $I_t$ to the internet browser, performing the identifying of the longest time duration $I_{max}$ by the internet browser, wherein the received request for visualizing the time series relation, further indicates the identified longest time duration $I_{max}$.

For example, the internet browser may receive a user input indicating the data source. The user input may further comprise a request for the time durations. The internet browser may automatically send the information request to the data source upon receiving the user input. Performing the selection of the time duration locally (e.g. by identifying the longest time duration that is smaller than or equal to the time duration $I_{opt}$) at the internet browser may be advantageous as it may enable a flexible and controlled selection of the time duration to be used, e.g., the user can change the selection criterion locally without having to change it on each of the data sources.

The time duration $I_{opt}$ represented by each pixel width of the canvas may be determined using the determined time durations $I_t$. For example, the time duration $I_{opt}$ may be one of the determined time durations $I_t$. This may be an accurate representation of data by the chart.

In another example, the time duration $I_{opt}$ may be chosen different from the determined time durations $I_t$. This may enable to further reduce the amount of data to be displayed because the received tuples would be reduced by the application of the M4 aggregation. In other words, in this case there is more data than can possibly be displayed for the user, due to the limited number of pixels available on the browser canvas. By applying the M4 aggregation to the data, the data may be reduced and an aggregation where the interval matches $I_{opt}$ may be achieved.

According to one embodiment, the identifying of the longest time duration $I_{max}$ is performed by the data source. Performing the identification at the data source may save processing resources that would otherwise be required for extra message exchanges between the data source and the internet browser, e.g., for an exchange of the value of $I_{max}$.

According to one embodiment, the method further comprises: providing multiple data sources, receiving by a server computer a sensor data request of types of sensor data from the internet browser, determining by the server computer the types of sensor data provided by the multiple data sources, sending by the server computer a response to the internet browser indicative of the determined types of sensor data, upon receiving by the internet browser, a selection of a type of sensor data of the received response, sending a data source request to the server computer for requesting features of one or more data sources of the multiple data sources that provide the selected type of sensor data, receiving by the internet browser from the server computer information indicative of the data source.

Each type of the types of sensor data may represent a thing. A thing may be a physical instance of a thing type. For example, a thing may be a specific component of a manufacturing facility such as a drive, a valve, an actuator, a heating system etc.

According to one embodiment, the method further comprises: receiving by the data source from the internet browser a data availability request, sending a data availability information to the internet browser, wherein the receiving of the request is performed upon sending the data availability information. This embodiment may save processing resources that would otherwise be required by an unnecessary data request for unavailable data.

According to one embodiment, the method further comprises: providing a server computer and performing the method using the server computer as a proxy server for communication between the internet browser and the data source.

The server computer may enable transparent access to data for the users. The access is transparent in that the user does not need to know where the data comes from, e.g., the user has only to specify a type of data and the visualization time range. The server computer may provide centralized control of access to the data sources. This may enable consistent access to the data sources and may also increase the security aspect of the present embodiment. The server computer may be remotely connected to the client system and may be remotely connected to the data source.

According to one embodiment, the method further comprises: transferring one or more further groups of the set of groups that has been generated for the identified longest time duration $I_{max}$, each further group spanning beyond the visualization time range, wherein the M4 algorithm is performed on tuples of the selected subset and the further groups.

For example, the visualization time range may be [$t_S$, $t_E$], and the further groups may cover for example time intervals [$t_E$,$t_D$], [$t_M$,$t_S$], [$t_D$,$t_L$], etc. Providing further groups may be advantageous as the visualization time range may be extended by a few time bins without having to access the data source again. The number of further groups may be smaller than a predefined maximum number. This may enable control of the network bandwidth usage.

According to one embodiment, the method further comprises: caching by the internet browser the received tuples.

The tuples are cached such that they are available in the future when a time duration whose associated predefined time duration is $I_{max}$ is needed by the user or by another user. This may particularly be advantageous when monitoring time series data. The monitoring may be performed for example to detect anomalies in data. The monitoring may be performed by multiple users using the same terminal. Thus, data cached for one user may be used by another user. This may save the internet browser from fetching the same tuples from the data source to include on the line chart. For example, time and computed resources for fetching and browser-side pre-processing of the data might be reduced as only the new or changed data may need to be processed whereas the remaining data can be read from the cache.

According to one embodiment, the method further comprises receiving a zoom operation on the canvas, the zoom operation resulting in a change of the visualization time range, the changed visualization time range is larger than the visualization time range, wherein the changed visualization time range comprises one or more time subranges beyond the visualization time range, determining using the changed visualization time range a changed time duration $I_{opt2}$ represented by the width of each pixel of the canvas, sending to the data source another request for visualizing sensor data, the other request indicating at least the changed time duration $I_{opt2}$, and the time subranges, identifying the longest time duration $I_{max2}$ of the determined time durations $I_t$ that is smaller than or equal to the changed time duration $I_{opt2}$, receiving from the data source tuples of the set of groups that has been generated for the identified longest time duration $I_{max2}$ the received tuples cover time intervals that span the time subranges, performing a M4 aggregation comprising generating, from the received tuples and the displayed tuples, a set of consecutive w groups, each group of the w groups comprising tuples covering a time interval having the time duration $I_{opt2}$, determining for each group of the w groups an updated set of aggregates, the updated set of aggregates comprising tuples of the each group having respectively the minimum value, the maximum value, the smallest timestamp and the highest timestamp, using the updated sets of aggregates for updating the displayed line chart.

According to one embodiment, the method further comprises receiving a zoom operation on the canvas, the zoom operation resulting in a change of the visualization time range, the changed visualization time range is smaller than the visualization time range, determining using the changed visualization time range a changed time duration $I_{opt2}$ represented by the width of each pixel of the canvas, sending to the data source another request for visualizing sensor data, the other request indicating at least the changed time duration $I_{opt2}$ and the changed visualization time range, identifying the longest time duration $I_{max2}$ of the determined time durations $I_t$ that is smaller than or equal to the changed time duration $I_{opt2}$, receiving from the data source tuples of the set of groups that has been generated for the identified longest time duration $I_{max2}$, the received tuples cover time intervals that span the changed visualization time range, providing an input set comprising the received tuples, performing an M4 aggregation comprising generating, from the received tuples, a set of consecutive wgroups, each group of the w groups comprising tuples covering a time interval having the time duration $I_{opt2}$, determining for each group of the w groups an updated set of aggregates, the set of aggregates comprising tuples of the each group having respectively the minimum value, the maximum value, the smallest timestamp and the highest timestamp, using the updated sets of aggregates for updating the displayed chart.

According to one embodiment, the method further comprises: sending to a server computer a sensor data request of types of sensor data, determining by the server computer the types of sensor data provided by multiple data sources, receiving from the server computer a response indicative of the determined types of sensor data, upon receiving a selection of a type of sensor data of the received response, sending a data source request to the server computer for requesting features of one or more data sources of the multiple data sources that provide the selected type of sensor data, receiving from the server computer information indicative of the data source.

According to one embodiment, the method further comprises: sending a data availability request, receiving a data availability information from the data source, the request for visualizing sensor data is sent upon determining that the data is available using the data availability information.

FIG. 1 depicts a schematic block diagram of a computer system 100 in accordance with an example of the present subject matter.

The computer system 100 comprises a server 104 and a number of clients 101, indicated individually as 101 *a*, 101 *b* . . . 101 *n*. The clients 101 may comprise computers, data processing systems, workstations, handheld portable information devices, or computer networks. The clients 101 may be the same or different.

The server 104 and clients 101 may be interconnected by a network 102. In one example, the network 102 comprises the internet. In another example, the network 102 comprises a wireless link, a telephone communication, a radio communication, or computer network, e.g., a local area network (LAN) or a wide area network (WAN).

The computer system 100 may further include data sources 105, indicated individually as 105 *a*, 105 *b* . . . 105 *n*, connected to the server 104. The data sources 105 may comprise storage media, databases (e.g., a relational database such as the DB2™ product from IBM), or a set of documents such as Extensible Markup Language (XML) documents and parquet files. The data sources 105 may be configured to store sensor values for sensors at each of a plurality of times. The interface between the server 104 and data sources 105 may comprise a LAN, the internet, or a proprietary interface. The data sources 105 may be accessed by the server 104 and clients 101. The server 104, clients 101, and data sources 105 may be located remotely from one another or may share a location.

Each of the clients 101 may comprise a data access application program (or browser application) that is configured to fetch data from the data sources 105 and display it on a display device of the client. The data access application program may be configured to perform at least part of the method steps performed at the client 101. The data access application program may, for example, be an internet browser in cases where the network 102 comprises the internet. For example, the internet browser may comprise a web browser program such as Microsoft Internet Explorer™, Google Chrome™ or Mozilla Firefox™. In another example, the data access application program may comprise an SAP HANA XSA application, a Cloud Foundry application or an application running on Kubernetes.

Each of the clients 101 may be configured to access the data in the data sources 105 directly and/or via the server 104. For example, the server 104 may comprise one or more adapters that connect each data source of the data sources 105 to the server 104. For example, the server 104 may be equipped with a web server that enables access to a web based data source.

Figure 2:
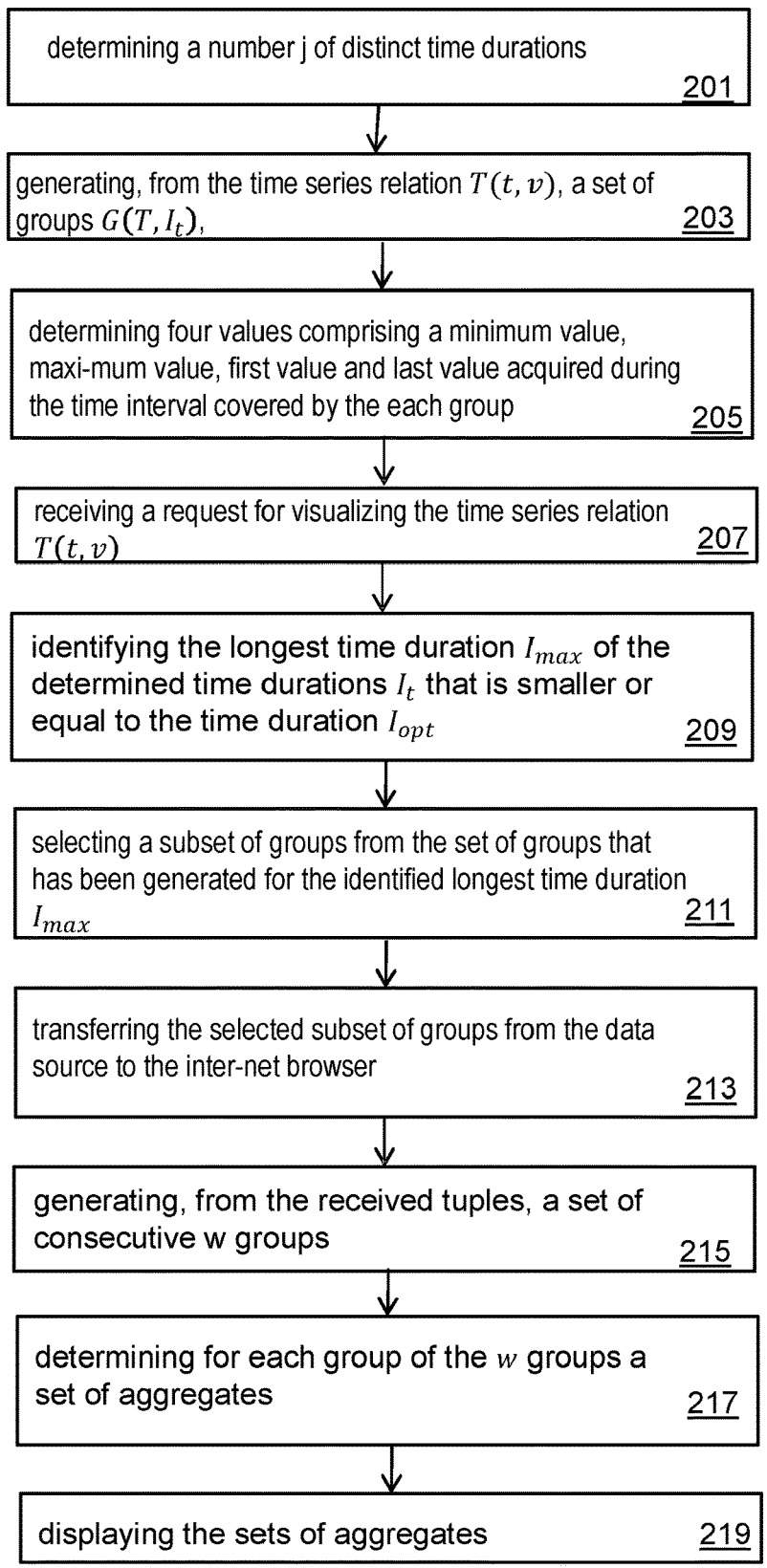
FIG. 2 is a flowchart of a method for visualizing a time series relation T(t, v) in accordance with an example of the present subject matter.

FIG. 2 is a flowchart of an example method for visualizing a time series relation $T(t, v)$ in accordance with the present subject matter. For the purpose of explanation, the method may be implemented in the computer system 100 illustrated in previous FIG. 1, but is not limited to this implementation.

For example, the present method may enable a client 101a of the clients 101 to access data of a data source 105a of the data sources 105. For that purpose, the internet browser of the client 101a may be launched or started at the client 101a. The launching of the internet browser may result in displaying a browser window on a display device of the client 101a. The browser window may for example comprise graphical user interface (GUI) components. A GUI component may be an object with which the user interacts via the mouse or keyboard. For example, the browser window may comprise a time range GUI component for defining a time range. The browser window may further comprise a data source GUI component for listing accessible data sources and for selecting one or more data sources to be accessed by the client 101a. For example, the user may use the data source GUI component for searching or requesting the list of data sources that can provide sensor data of a certain type, e.g., the user may request a given thing type in order to get the IoT devices of that requested thing type. The requested list of data sources may be displayed on the browser window so that the user can select the data source 105a to be accessed.

The selected data source 105a may comprise a time series relation $T(t, v)$. The time series relation $T(t, v)$ may comprise pairs or tuples $(t, v)$ of timestamp and value. In one example, the time series relation $T(t, v)$ may be obtained by acquiring sensor data v and timestamping t the acquired data. For that, the data source 105a may, for example, comprise one or more sensors or IoT devices for acquiring the sensor data. The data source 105a may further comprise a storage system for storing the acquired data. For example, the data acquired by the sensors may be streamed by a streaming server of the data source 105a before being converted into time series data and stored in the storage system. In another example, the data source 105a may be configured to receive and store the time series relation $T(t, v)$ from a third-party system, e.g., the sensor data may be acquired independently of the data source. This allows for flexible deployment of the present method.

A number j of distinct time durations may be determined in step 201. A time duration of the determined time durations may for example be 2 minutes, 30 minutes etc. The time durations may be determined by the data source 105a or by the client 101a. Determining the time durations by the client 101a may be advantageous as this may satisfy user needs on individual basis. This may increase the efficiency of the present method in that unnecessary data access attempts, potentially caused by erroneous or unsuitable determined time durations, may be avoided. Determining the time durations by the data source 105a, may be advantageous as it may provide centralized and consistent access control to data by different users.

The determining of the distinct time durations may for example comprise reading the time durations from a storage system. The storage system may, for example, be shared between the client 101a and data source 105a. In another example, the determining of the distinct time durations may comprise prompting a user to provide the time durations, and in response to the prompting receiving the time durations. In cases where the time durations are determined by the client, the method may further comprise a step of sending by the client 101a the determined time durations to the data source 105a, or of storing the determined time durations in the shared storage system. The number of time durations may be smaller than a maximum threshold. This may be advantageous, as many users may want to define their own time durations, and the data source can control that.

In one example, the time durations may be determined dependent on the age of data of the time series relation. This may enable a tiering over time, e.g., time durations of 1 minute, 2 minutes, 5 minutes, or 1 hour may be determined for recent data younger than a predefined time, for example, 1 year. For data older than, e.g., 1 year, only 1 hour in time duration may be determined, as it is unlikely that users will do more sophisticated analyses on old data.

For each distinct time duration $I_t$ of the determined time durations, a set of groups $G(T, I_t)$ may be generated in step 203 from the time series relation $T(t, v)$.

In one example, the set of groups may be provided as follows. Each group $B_{I_t,i}$ of the set of groups $G(T, I_t)$ may for example be provided as a data structure. i is an index that identifies individual groups of the set of groups $G(T, I_t)$. The data structures may be empty data structures. Each group of the set of groups $G(T, I_t)$ may be assigned a respective time interval having the time duration $I_t$. The time intervals of the set of groups $G(T, I_t)$ may be consecutive time intervals. In order to store the corresponding data in the created empty structures, the following may be performed: A data generation time interval may be defined. The data generation time interval may, for example, be defined by a start time t0 and an end time tx: [t0, tx]. In one example, t0 may be the lowest timestamp of the time series relation $T(t, v)$ and tx may be the highest timestamp of the time series relation $T(t, v)$ i.e. the data generation time interval is the interval covered by all data of the time series relation $T(t, v)$. Having a data generation time interval that covers all data of the time series relation $T(t, v)$ may be advantageous as it may increase the volume of the analysis sample that can be used by a user. In another example, the data generation time interval may be a sub time interval of the time covered by the time series relation $T(t, v)$, e.g., the data generation time interval may be the last year; last month etc. This may be advantageous as it may for example avoid using data that is obsolete but still stored in the data source 105a. This may save computing and, especially, storage resources. The time duration of the data generation time interval [t0, tx] may be divided by the time duration $I_t$. And, the integer part (dT) of the result of the division may be the number of groups $B_{I_t,i}$, e.g., if $I_t$=2 min, the integer part dT of the result of the division may indicate the number of intervals of 2 min that can be derived from the time series relation $T(t, v)$. The set of groups $G(T, 2\ min)$ may for example be associated with time intervals [t0, t1], [t1, t2], [t2, t3] . . . where t0–t1=$I_t$, t2–t1=$I_t$, t3–t2=$I_t$, etc. Each given group of the set of groups $G(T, I_t)$ is processed so that it comprises sensor data that has a timestamp within the time interval associated or covered by the given group.

The content of each group of the set of groups $G(T, I_t)$ may for example be derived from the time series relation $T(t, v)$ using a surjective grouping function $f_g(t)$ that assigns data of the time series relation $T(t, v)$ to corresponding groups of the set of groups $G(T, I_t)$. For that the groups may be indexed following the order of their associated time interval, e.g., the first ordered group [t0, t1] may have index 1. The surjective grouping function $f_g(t)$ may be defined as follows: $f_g(t)=\lfloor (t-t0)/I_t \rfloor+1$. A tuple (t, v) is assigned to $B_{I_t,i}$ if $f_g(t)=i$.

In another example, each group of the set of groups $G(T, I_t)$ may be defined/declared. Each group of the set of groups $G(T, I_t)$ may be assigned a respective time interval having the time duration $I_t$. The time intervals of the set of groups $G(T, I_t)$ may be consecutive time intervals. The surjective grouping function $f_g(t)$ may be used to assign data of the time series relation $T(t, v)$ to corresponding groups of the set of groups $G(T, I_t)$. Each group $B_{I_t,i}$ of the set of groups $G(T, I_t)$ may be indicated by tagging or labelling the tuples of the time series relation with a tag (e.g. a tag proportional to i) indicative of the group $B_{I_t,i}$ e.g. the tuples may be defined as $(t, v, i, I_t)$. This may save processing resources that would otherwise be required when using separate data structures for storing the groups.

Hence, by first defining the groups $B_{I_t,i}$ and further assigning the tuples to the defined groups, step 203 may efficiently generate the set of groups $G(T, I_t)$.

Following the above example of 2 minute and 30 minute time durations, step 203 may result in two sets of groups $G(T, 2\ min)$ and $G(T, 30\ min)$. $G(T, 2\ min)$ comprises groups $B_{2\ min\ i}$ each of which covers a time interval having the time duration of 2 minutes. $G(T, 30\ min)$ comprises groups $B_{30\ min\ i}$ each of which covers a time interval having the time duration of 30 minutes.

For each group of the generated sets of groups resulting from step 203, one or more representative values may be determined in step 205. In one example, the representative values may comprise at least one of a minimum value, maximum value, first value and last value acquired during the time interval covered by the group. Following the above example, the tuples of group $B_{2\ min\ 1}$ may be processed to identify the four values which are the minimum value, maximum value, first value and last value acquired during the time interval [t0, t1]. Those four values may be an accurate representation of the tuples of $B_{2\ min\ 1}$ and of their behaviour. Thus, instead of using all tuples (e.g. 1000) of $B_{2\ min\ 1}$ at most four tuples may be sufficient. The four tuples may comprise the four values and associated timestamps.

In another example, for each group of the generated groups, the representative values may comprise a predefined subset of values of the values acquired during the time interval covered by the groups. The predefined subset may for example be 10%, 20%, etc., of the values acquired during the time interval. The predefined subset may for example comprise values that are uniformly distributed in the time interval, e.g., if the time interval has a duration of 10 minutes, the 10% of data may comprise 1% of data in each minute of the time interval.

Steps 201-205 may be part of a preprocessing phase of the present method. The preprocessing phase may be performed at the data source. The result of the preprocessing phase may be preprocessed tuples. The preprocessed tuples may be stored at the data source. The preprocessed tuples comprise the four tuples of each group of all groups that resulted from step 203. Following the above example, and if the two sets of groups $G(T, 2\ min)$ and $G(T, 30\ min)$ that resulted from step 203 comprise 1500 and 100 groups respectively, the output or outcome of the preprocessing phase may be at most 4*(1500+100) tuples; the preprocessed tuples comprise 6400 tuples.

The preprocessed tuples may be provided by the data source 105a so that they can be more efficiently accessed by the clients 101. In one example, the preprocessed tuples may replace the time series relation $T(t, v)$, e.g., the time series relation $T(t, v)$ may be deleted after the preprocessing phase. This may save storage resources at the data source. In one example, the deletion of the time series relation $T(t, v)$ may be performed if the number j of time durations is higher than a predefined threshold—that is, the deletion may occur only if enough time durations are covered by the preprocessing phase.

After completion of the preprocessing phase, a data access phase may be performed. The data access phase may comprise steps 207-219.

Figure 4A:
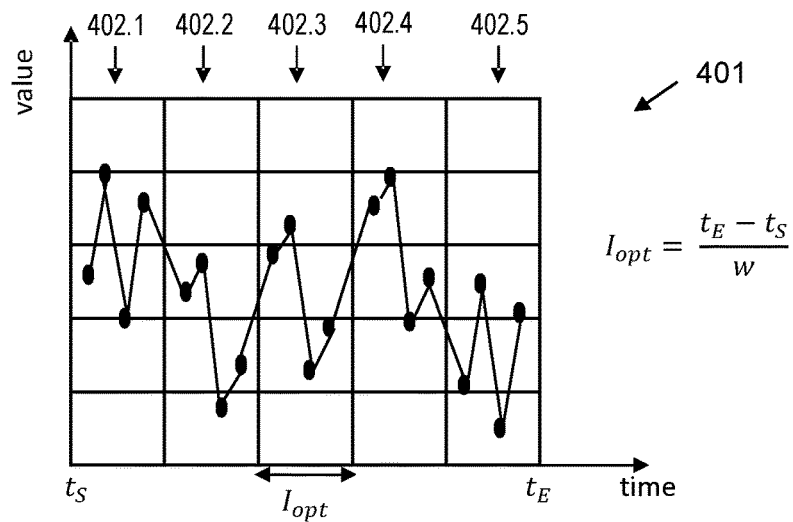
FIG. 4A shows a time series graph in accordance with an example of the present subject matter.

A visualization request for visualizing the time series relation $T(t, v)$ may be received at the data source 105a from the internet browser in step 207. The visualization request is intended to access the preprocessed tuples. With the preprocessed tuples, the visualization request may indicate only the data source and one or more graph parameters descriptive of a graphical area or canvas of the browser window. In one example, the canvas may comprise a time series graph. The time series graph may be an empty graph or may have data displayed on it. The time series graph (e.g. as shown in FIG. 4A) may comprise a horizontal x-axis and a vertical y-axis. The x-axis has a width of w pixels. The x-axis comprises time values and covers a visualization time range $[t_S, t_E]$—that is, the width of each pixel of the canvas is representative of a time duration $$I_{opt} = \frac{t_E - t_S}{w}.$$

The graph parameters may for example comprise the time duration $I_{opt}$ and the width w. Thus, the visualization request may be a simplified request indicating (e.g. listing) the data source, $I_{opt}$ and w only.

The longest time duration $I_{max}$ of the determined j time durations $I_t$ that is smaller than or equal to the time duration $I_{opt}$ may be identified in step 209. Step 209 may be performed before or after step 207.

Performing step 209 before step 207 may be advantageous because this may enable to adapt the visualization time range without having to resend the visualization request. For example, if all determined j time durations $I_t$ are larger than $I_{opt}$, the visualization time range $[t_S, t_E]$ may be adapted in step 207 so that the resulting $I_{opt}$ may have a matching time duration in the determined j time durations $I_t$. In this case, the identification of the longest time duration $I_{max}$ may advantageously be performed by the internet browser. The longest time duration $I_{max}$ identified by the internet browser may be sent to the data source, e.g., as part of the visualization request.

Performing step 209 after step 207 may be advantageous if step 209 is performed by the data source. This is because, in cases where step 209 is performed by the data source before step 207 an extra messaging between the internet browser and the data source may be used for providing the time duration $I_{opt}$ to the data source. In another example, if all determined j time durations $I_t$ are larger than $I_{opt}$ (i.e. $I_{max}$ may not be found), the data source may be configured to generate the preprocessed tuples for a time duration that is smaller than or equal to $I_{opt}$ and this time duration may be $I_{max}$. In another example, the data source may be configured to respond with data of the time series relation as soon as none of the j determined durations is smaller than $I_{opt}$ is available (i.e. $I_{max}$ may not be found), as the raw data may be used for a precise representation at a fine grain level.

The data source 105*a* may select in step 211, from the set of groups that has been generated for the identified longest time duration $I_{max}$, a subset of groups whose time intervals span at least the visualization time range $[t_S, t_E]$, e.g., time intervals spanning the visualization time range or spanning the visualization time range and a further range. For that, the time interval associated with each group of the set of groups that has been generated for the identified longest time duration $I_{max}$ may be compared with the visualization time range $[t_S, t_E]$. If the time interval completely or partially overlaps with the visualization time range $[t_S, t_E]$, the group may be selected.

In another example, additional groups of the set of groups that has been generated for the identified longest time duration $I_{max}$ may be selected. The time intervals of these additional groups are, for example, the nearest two intervals before and after the visualization time range $[t_S, t_E]$. These additional groups may be advantageous as their tuples can be used to extend the visualization time range without having to request data from the data source again. The extension of the visualization time range may cover extra time bins.

The selected subset of groups may be transferred in step 213 from the data source to the internet browser. The tuples of the selected subset of groups may be transferred in step 213 to the internet browser.

Upon receiving the transferred tuples by the internet browser, the internet browser may perform an M4 aggregation. The M4 aggregation may be performed using as inputs the received tuples with time duration $I_{max}$, the number of pixels w along the x-axis, and the time duration $I_{opt}$. The M4 aggregation may be performed as follows: In step 215, the internet browser may generate, from the received tuples, a set of consecutive w groups (corresponding to the number w of pixels), wherein each group of the w groups comprising tuples covering a time interval having the time duration $I_{opt}$. For example, the received tuples may be merged in one time series. And the w groups may be generated as described for example with reference to step 203 so that each group of the w groups may comprise respective tuples of the received tuples.

The internet browser may determine in step 217 for each group of the w groups, a set of aggregates. The set of aggregates of a group comprises at most four tuples of the group having, respectively, the minimum value, the maximum value, the smallest timestamp and the highest timestamp. For example, if the minimum value is the same as the first acquired value in a time interval covered by a group, the set of aggregates of said group may comprise less than four tuples, e.g. three tuples, to avoid having duplicate tuples, wherein the three tuples provide the minimum value, the maximum value, the smallest timestamp and the highest timestamp. In another example, data of a given interval may only suffice to get a part of the four tuples.

The sets of aggregates may be displayed by the internet browser in step 219 on the canvas of the browser window as, for example, a line chart. The displaying may be performed so that each one of the sets of aggregates is displayed in one of pixel columns of the canvas. After displaying the sets of aggregates, a data visualization phase may start, during which the user may analyse the displayed data. During the data visualization phase the user may update the displayed data using the present subject matter, e.g., as described with reference to FIG. 3.

Figure 3:
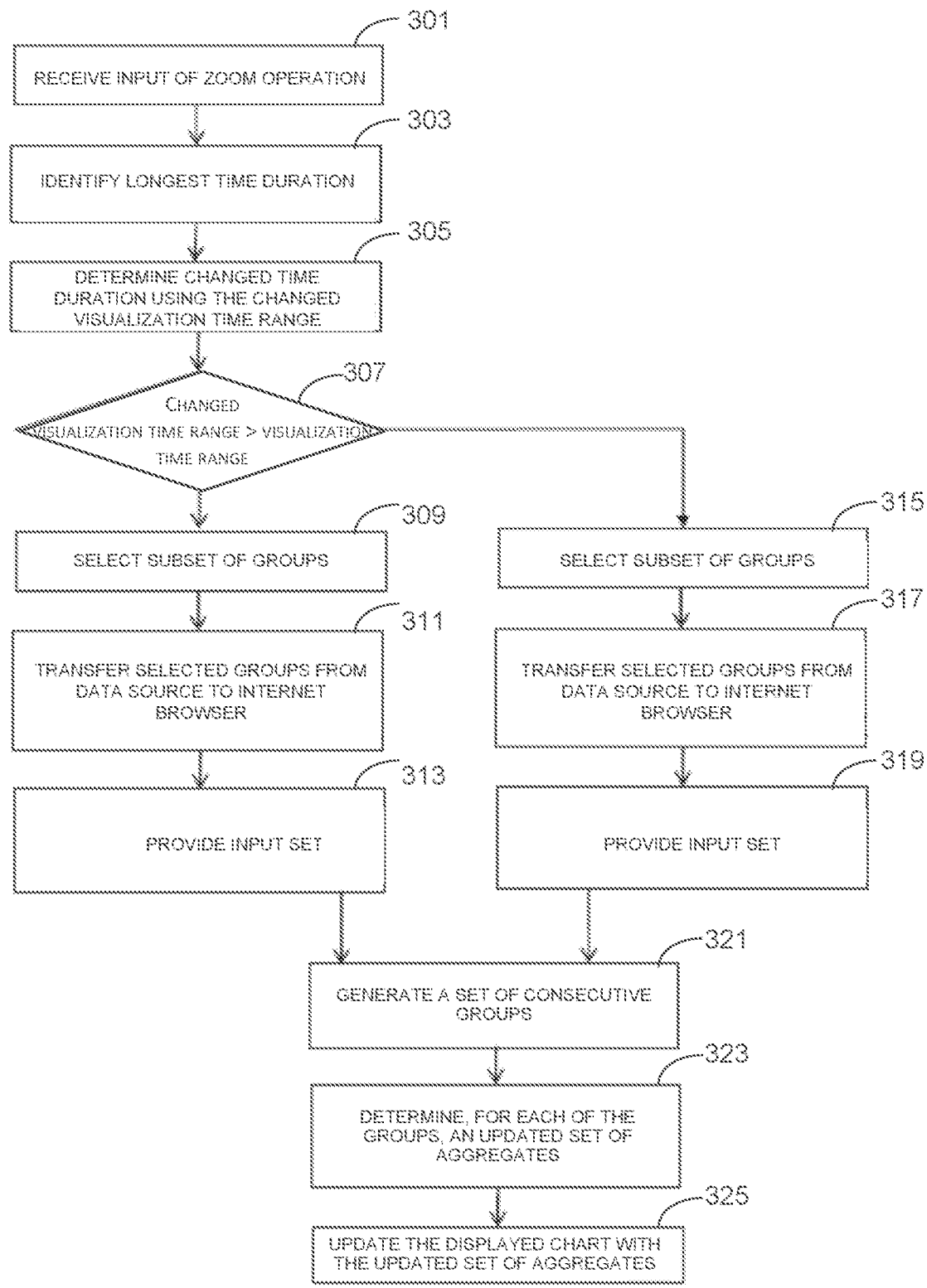
FIG. 3 is a flowchart of a method for visualizing a time series relation T(t, v) in accordance with an example of the present subject matter.

FIG. 3 is a flowchart of an example method for visualizing a time series relation T(t, v) in accordance with the present subject matter. For the purpose of explanation, the method may be implemented in the computer system 100, illustrated previously in FIG. 1, but is not limited to this implementation.

A zoom input indicating a required zoom operation may be received at the canvas in step 301. The zoom operation may cause the displayed graph enlarge or shrink—that is, the zoom operation results in a change of the visualization time range $[t_S, t_E]$.

Figure 4B:
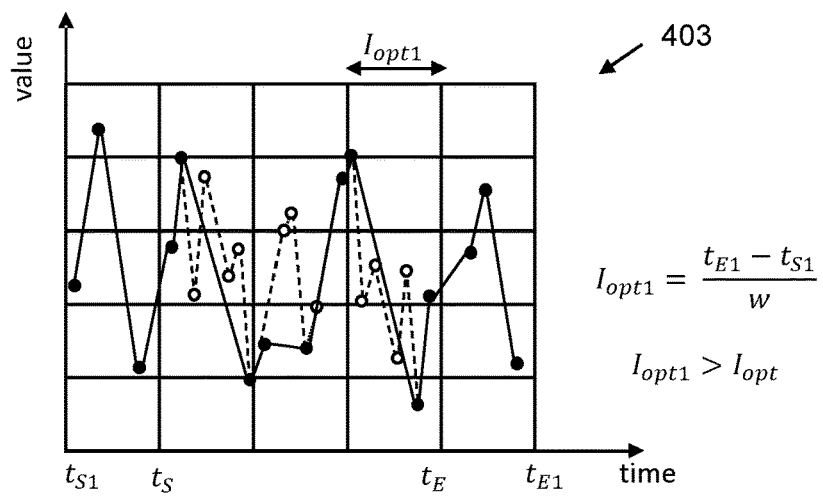
FIG. 4B shows a time-series graph in accordance with an example of the present subject matter.
Figure 4C:
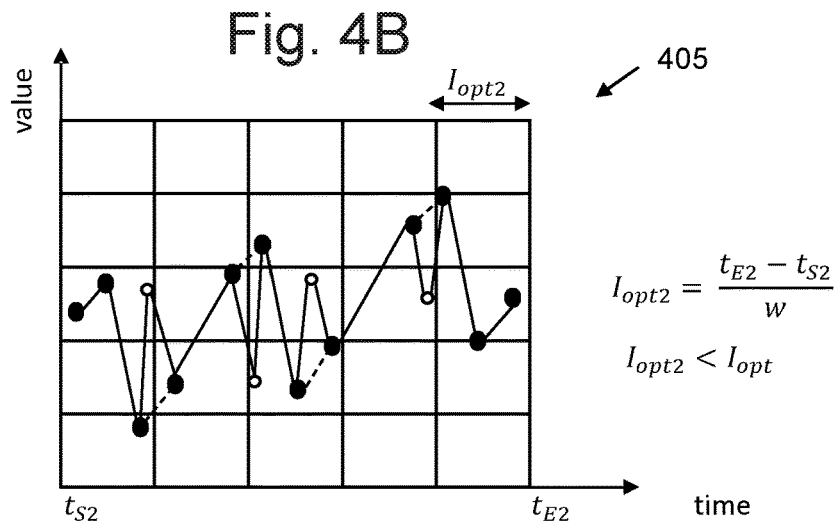
FIG. 4C shows a time-series graph in accordance with an example of the present subject matter.

FIG. 4A shows an example graph 401, which is displayed in the canvas. The graph 401 comprises an x-axis representing time and a y-axis representing the values of the sensor data. The graph 401 has a width determined by a number of w pixels. In the example of FIG. 4A, the width w is equal to 5 pixels along the x-axis. Each pixel column 402.1-402.5 displays the M4 aggregates. The zoom operation of the graph 401 results in the changed visualization time range $[t_{S1}, t_{E1}]$ or $[t_{S2}, t_{E2}]$. FIGS. 4B-4C show the graphs 403 and 405 associated with the changed visualization time ranges $[t_{S1}, t_{E1}]$ and $[t_{S2}, t_{E2}]$ respectively. The changed visualization time range $[t_{S1}, t_{E1}]$ is larger than the visualization time range $[t_S, t_E]$ and the changed visualization time range $[t_{S2}, t_{E2}]$ is smaller than the visualization time range $[t_S, t_E]$. The changed visualization time range $[t_{S1}, t_{E1}]$ comprises one or more time subranges that are beyond the visualization time range $[t_S, t_E]$. The time subranges may for example be $[t_{S1}, t_S]$ and/or $[t_E, t_{E1}]$. The graphs 403 and 405 show the new aggregates as filled circles and also show M4 aggregates from FIG. 4A as empty circles. FIGS. 4B-4C illustrate the difference between the aggregate distributions in each pixel column when changing the visualization time range.

A changed time duration $I_{opt2}$ represented by the width of each pixel of the graph 403 or 405 may be determined in step 303 using the changed visualization time range. In cases where the changed visualization time range is larger than the visualization time range, $I_{opt2}$ may be larger than $I_{opt}$. In cases where the changed visualization time range is smaller than the visualization time range, $I_{opt2}$ may be smaller than $I_{opt}$.

The longest time duration $I_{max2}$ of the determined time durations $I_r$ that is smaller than or equal to the changed time duration $I_{opt2}$ may be identified in step 305. In cases where the changed visualization time range is larger than the visualization time range, step 305 may not be performed and the longest time duration $I_{max2}$ may be set to the value of $I_{max}$. This may save processing resources that would otherwise be used for performing step 305.

In cases (inquiry step 307) where the changed visualization time range is larger than the visualization time range, steps 309-313 may be performed otherwise steps 315-319 may be performed.

A subset of groups whose time intervals span the time subranges (e.g. $[t_{S1}, t_S]$) may be selected in step 309—that is, the groups associated with the (initial) visualization time range $[t_S, t_E]$ need not be selected again. The selection of the subset may be performed from the set of groups that has been generated for the identified longest time duration $I_{max2}$.

The selected subset may be transferred in step 311 from the data source to the internet browser. Furthermore, an input set may be provided in step 313. The input set comprises the received tuples of the selected subset in addition to the displayed tuples. The displayed tuples represent the (initial) visualization time range. Transferring only tuples that cover the time subranges may save network bandwidth. In addition, if the longest time duration $I_{max2}$ is chosen to be the same as $I_{max}$, the input set may comprise data (displayed and received tuples) that is coherently distributed over time.

A subset of groups whose time intervals span the changed visualization time range [$t_{S2}$, $t_{E2}$] may be selected in step 315. The section of the subset may be performed from the set of groups that has been generated for the identified longest time duration $I_{max2}$.

The selected subset may be transferred in step 317 from the data source to the internet browser. An input set may be provided in step 319. The input set comprises the received tuples of the selected subset. In the present case, the displayed tuples may not be useful for performing the M4 aggregation because their time duration $I_{opt}$ may be larger than $I_{opt2}$.

The internet browser may perform the M4 aggregation using the input set as follows. In step 321, the internet browser may generate, from the input set, a set of consecutive w groups, wherein each group of the w groups comprises tuples covering a time interval having the time duration $I_{opt2}$. The internet browser may determine in step 323 for each group of the w groups an updated set of aggregates. The set of aggregates comprises tuples of each group. The tuples comprise respectively the minimum value, the maximum value, the lowest timestamp, and the highest timestamp in the given interval. The tuples may be distinct tuples. The tuples may comprise at most four tuples. In certain cases, one tuple can for example have both the smallest timestamp and the smallest value in which case the group may only have at most three tuples.

In step 325, the internet browser may use the updated sets of aggregates for updating the displayed line chart in graph 403 or 405.

Figure 5:
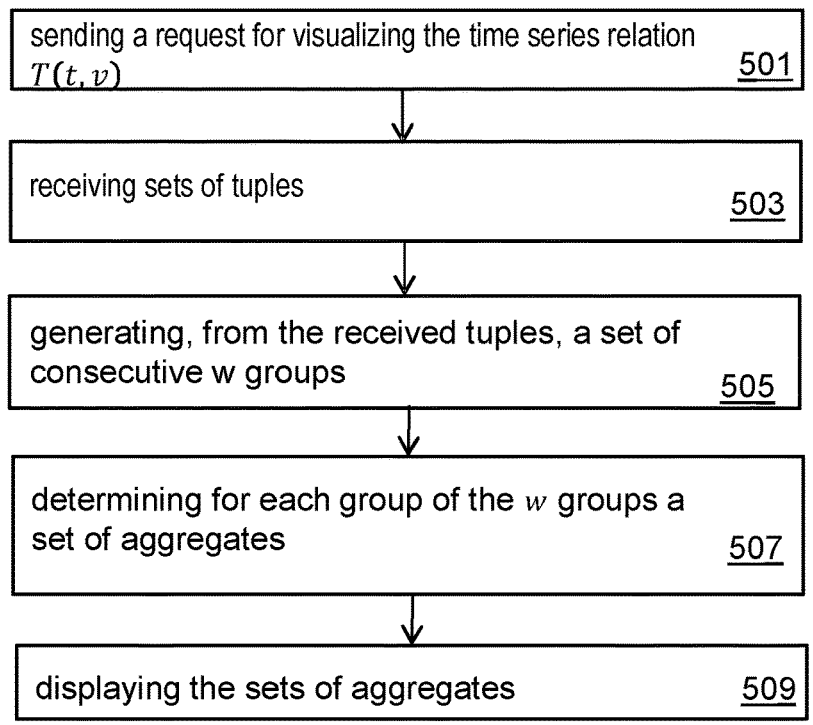
FIG. 5 is a flowchart of a method for visualizing sensor data of a data source in accordance with an example of the present subject matter.

FIG. 5 is a flowchart of a method for visualizing sensor data of at least one data source.

In step 501, a client system may send to the at least one data source a request for visualizing sensor data, whereby the visualization is to be performed within a canvas area of a browser window. The canvas has a width of w pixels and covers a visualization time range. The width of each pixel of the canvas is representative of a time duration $I_{opt}$.

In step 503, the client system may receive from the at least one data source consecutive sets of tuples each of which covers a time interval having one or more time durations $I_t$ ($I_t \leq I_{opt}$). In one example, the reception of the tuples may be performed upon sending the visualization request. This may be advantageous as the client system may receive only the amount of data that is needed for the requested visualization. In another example, the reception of the tuples may automatically be performed, e.g., the data source (cf. FIG. 6) may be configured to automatically send produced tuples to the client system as soon as they are produced, without having to receive a request for the tuples (in this case, step 501 may be an optional step). This may enable the performance of a (quasi) real-time analysis of data at the client system. For example, the client system may subscribe to changes in the data within the data source. Once the respective tuples have been produced, the data source may then send new or changed data directly to the client system. This may enable a (quasi) real-time analysis of data at the client system.

The set of tuples comprises representative values and associated timestamps. The representative values may comprise a minimum value, maximum value, first value and last value acquired during the time interval. The client system may perform the M4 aggregation as follows. In step 505, the client system may generate, from the received tuples, a set of consecutive w groups (w is the width of the canvas), wherein each group of the w groups comprises tuples covering a time interval that has the time duration $I_{opt}$.

The client system may determine in step 507 for each group of the w groups a set of aggregates. The set of aggregates comprises four tuples of the group having respectively the minimum value, the maximum value, the smallest timestamp and the highest timestamp. The client system may display in step 509 the w sets of aggregates on the canvas of the browser window as a line chart, wherein each one of the sets of aggregates is displayed in one pixel column of pixel columns of the canvas.

Processing the received tuples locally at the client system for the generation of further tuples may prevent the performance of the preprocessing on multiple sources and the combination of results from this multiple processing. This may save processing resources and may provide a centralized control of aggregates production.

A computer program comprising machine executable instructions for execution by a processor may be provided, wherein execution of the machine executable instructions causes the processor to perform the method of FIG. 5.

Figure 6:
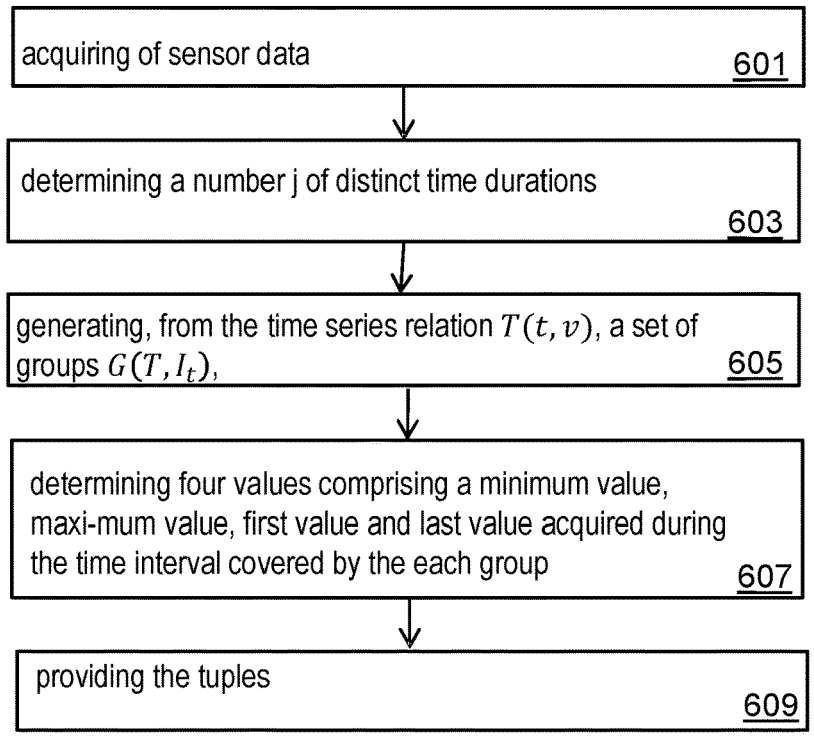
FIG. 6 is a flowchart of a method for storing time series data in accordance with an example of the present subject matter.

FIG. 6 is a flowchart of a method for storing time series data. The method shown in FIG. 6 may be performed by a data source, e.g., 105a. In step 601, sensor data may be acquired. Steps 603, 605 and 607 are the same as steps 201, 203, and 205, respectively, of the method shown in FIG. 2. In step 609, the produced tuples may be provided. In one example, the produced tuples may be stored. For example, after storing the tuples, the time series relation may be deleted or may be archived. In another example, the produced tuples may be transmitted to the internet browser regardless of any request received from the user. This may be advantageous as the data may continuously be available on user side, ready for local processing.

A computer program comprising machine executable instructions for execution by a processor may be provided, wherein execution of the machine executable instructions causes the processor to perform the method of FIG. 6.

Figure 7:
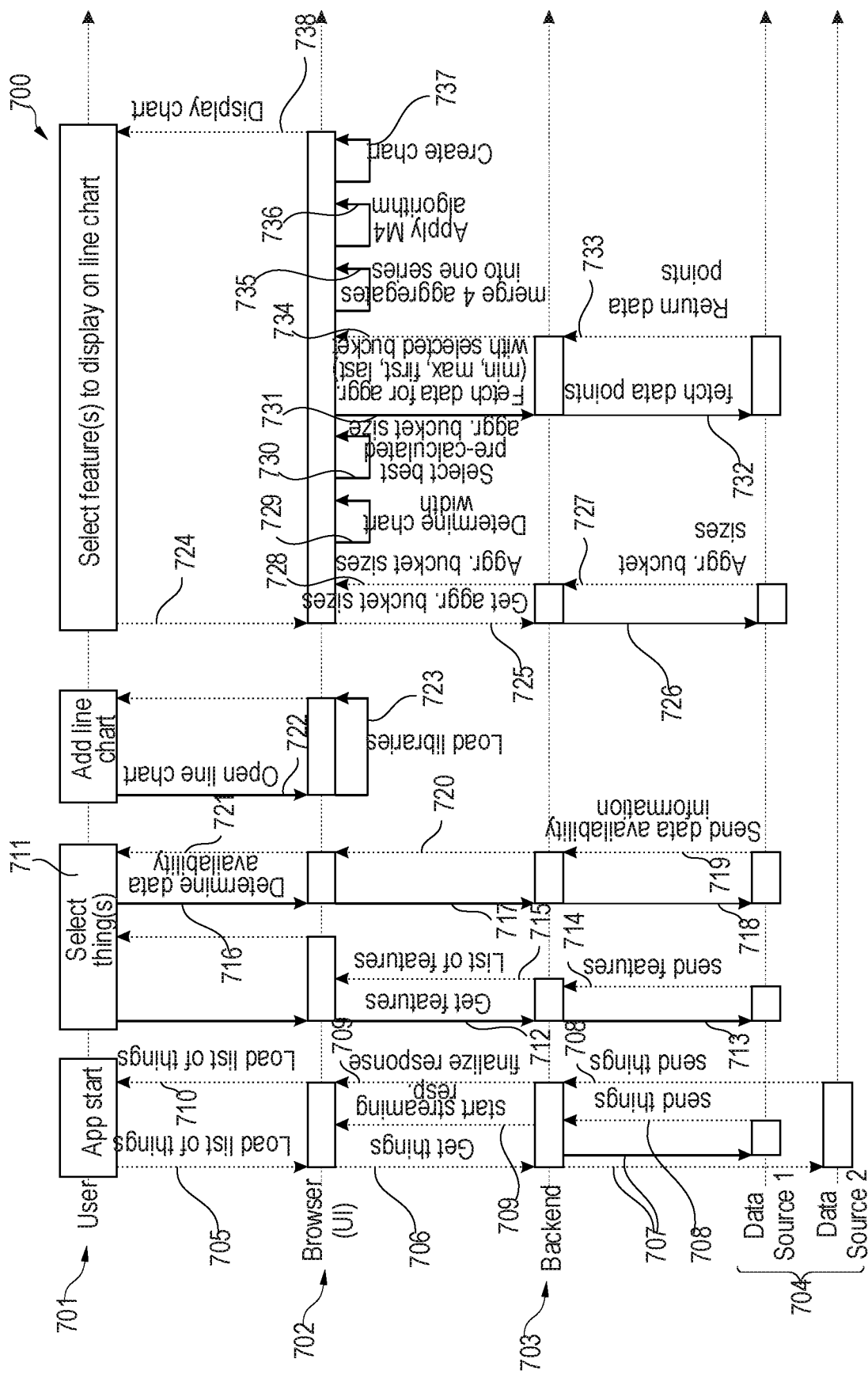
FIG. 7 is a flow diagram of a method for visualizing time series data in accordance with an example of the present subject matter.

FIG. 7 is a flow diagram 700 of a method for visualizing time series data of data sources 704, by a user 701 using a browser 702 and a backend system 703.

The user 701 may start the browser 702 which may result in displaying a browser window. The user may load (705) the list of things. A thing may represent an observable object such as a car. This may result in the browser requesting (706) the things from the data sources 704 via (707) the backend system 703. The data sources 704 may in response send (708) the things they represent to the backend system 703. The backend system 703 may send (709) a response to the browser indicating the list of things. The browser may load (710) the list of things on the browser window.

The user 701 may select (711) one or more things of the list of things. Upon receiving the selection, the browser 702 may request (712) via the backend system 703 (713) features related to the one or more data sources 704 that represent the selected things. A feature may relate to an individual property that is measured, for example by a sensor, for a given thing such as the oil temperature. The one or more data sources may send back (714) the list of features to the browser 702 via (715) the backend system 703. The features may be provided by the browser on the browser window.

The user 701 may request (716, 717, 718) data availability of the one or more data sources via the browser 702 and the backend system 703 and may receive (719, 720, 721) the data availability information.

Upon receiving the data availability information, the user 701 may open (722) a line chart in the browser window and the bowser 702 may load (723) libraries accordingly.

The user 701 may request (724, 725, 726) the list of bucket sizes (or time durations) from the one or more data sources. The browser may receive (727, 728) the list of bucket sizes from the one or more data sources via the backend system.

Upon receiving the list of bucket sizes, the browser 702 may determine (729) the chart width and may select (730) the best bucket size, $I_{max}$, of the list. The browser may request (731, 732) via the backend system the data points that correspond to the selected bucket size and the chart width. The browser may receive (733, 734) via the backend system sets of aggregates, wherein each set of aggregate comprises the minimum value, maximum value, first value and last value acquired for the selected bucket size.

The browser may merge (735) the received sets of aggregates into one time series. The browser may apply the M4 algorithm (or M4 aggregation) on the one time series with at most four tuples per duration $I_{max}$ to produce a time series that has at most four tuples per time duration $I_{opt}$. The result of the application of the M4 algorithm may be used to create (737) a line chart. The chart is displayed (738) to the user.

FIG. 8 is a block diagram of an exemplary computer system 800 such as client 101, data source 105 or server 104 suited for implementing at least part of method steps as described in the disclosure. The computer system 800 includes a processor 802 that executes software instructions or code stored on a computer readable storage medium 822 to perform at least part of the above-illustrated methods. The processor 802 can include a plurality of cores. The computer system 800 includes a media reader 816 to read the instructions from the computer readable storage medium 822 and store the instructions in storage 804 or in random access memory (RAM) 806. The storage 804 provides a large space for keeping static data where at least some instructions could be stored for later execution. According to some examples, such as some in-memory computing system embodiments, the RAM 806 can have sufficient storage capacity to store much of the data required for processing in the RAM 806 instead of in the storage 804. In some embodiments, the data required for processing may be stored in the RAM 806. The stored instructions may be further compiled to generate other representations of the instructions and may be dynamically stored in the RAM 806. The processor 802 reads instructions from the RAM 806 and performs actions as instructed. According to one example, the computer system 800 further includes an output device 810 (e.g., a display) to provide at least some of the results of the execution as output including, but not limited to, visual information to users and an input device 812 to provide a user or another device with means for entering data and/or otherwise interacting with the computer system 800. Such output devices 810 and input devices 812 could be joined by one or more additional peripherals to further expand the capabilities of the computer system 800. A network communicator 814 may be provided to connect the computer system 800 to a network 820 and in turn to other devices connected to the network 850 including other clients, servers, data stores, and interfaces, for instance. The modules of the computer system 800 are interconnected via a bus 818. Computer system 800 may be configured to access data source 824 via network 820.

The term "computer system" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or submodules of another software module, enterprise application, or hardware module without departing from the scope of this disclosure.

While this specification contains many specific implementation details, these should not be construed as limitations on the scope of any implementation or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some causes be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

The preceding figures and accompanying description illustrate the example processes and computer implementable techniques. But example environment (or their software or other components) contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, the example environment may use processes with additional, fewer and/or different operations, as long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "control system" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any implementation or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some causes be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

What is claimed is:

1. A method of visualizing a time series relation T(t, v), comprising:
   acquiring of sensor data v and timestamping t of the sensor data to provide the time series relation T(t, v) by at least one data source,
   determining a number j of distinct time durations $I_t$;
   for each distinct time duration $I_t$ of the determined time durations:
      generating, from the time series relation T(t, v), a set of groups $G(T, I_t)$, the set of groups $G(T, I_t)$ comprising consecutive groups $B_{I_t}$, each group of the set of groups $G(T, I_t)$ comprising sensor data that has a timestamp within the time duration $I_t$,
      for each group of the generated set determining four values comprising a minimum value, maximum value, first value and last value acquired during the time interval covered by the each group, and providing tuples comprising the four values and associated timestamps,
   receiving a request for visualizing the time series relation T(t, v) from an internet browser, whereby the visualization is to be performed within a canvas area of a browser window of the internet browser, the canvas having a width of w pixels and covering a visualization time range, each pixel of the canvas being representative of a time duration $I_{opt}$, identifying the longest time duration $I_{max}$ of the determined time durations $I_t$ that is smaller than or equal to the time duration $I_{opt}$, selecting, from the set of groups that has been generated for the identified longest time duration $I_{max}$, a subset of groups whose time intervals at least span the visualization time range, transferring the selected subset of groups from the data source to the internet browser, performing, by the internet browser, an M4 aggregation comprising:

generating, from the received tuples of the selected subset, a set of consecutive w groups, each group of the w groups comprising tuples covering a time interval having the time duration $I_{opt}$, determining for each group of the w groups a set of aggregates, the set of aggregates comprising tuples of the group having respectively the minimum value, the maximum value, the smallest timestamp and the highest timestamp, and displaying the w sets of aggregates on the canvas of the browser window as a chart, wherein each one of the sets of aggregates is displayed in one of pixel columns of the canvas.

2. The method of claim 1, the identifying of the longest time duration $I_{max}$ comprising:

receiving by the data source an information request of time durations from the internet browser;

upon receiving the information request, sending by the data source information indicative of the determined time durations $I_t$ to the internet browser, performing the identifying of the longest time duration $I_{max}$ by the internet browser, wherein the received request for visualizing the time series relation further indicates the identified longest time duration $I_{max}$.

3. The method of claim 1, wherein the request for visualizing the time series relation T(t, v) is further indicating the longest time duration $I_{max}$.

4. The method of claim 1, further comprising:

providing multiple data sources, receiving by a server computer a sensor data request of types of sensor data from the internet browser, determining by the server computer the types of sensor data provided by the multiple data sources, sending by the server computer a response to the internet browser indicative of the determined types of sensor data, upon receiving by the internet browser, a selection of a type of sensor data of the received response, sending a data source request to the server computer for requesting features of one or more data sources of the multiple data sources that provide the selected type of sensor data, receiving by the internet browser from the server computer information indicative of the at least one data source.

5. The method of claim 4, further comprising:

receiving by the data source from the internet browser a data availability request, sending a data availability information to the internet browser, wherein the receiving of the request for visualizing the time series relation T(t, v) is performed upon sending the data availability information.

6. The method of claim 5, further comprising providing a server computer and performing the method using the server computer as a proxy server for communication between the internet browser and the data source.

7. The method of claim 1, further comprising transferring one or more further groups of the set of groups that has been generated for the identified longest time duration $I_{max}$, each further group of the further groups spanning beyond the visualization time range, wherein the M4 aggregation is performed on tuples of the selected subset and of the further groups.

8. The method of claim 1, further comprising:

receiving a zoom operation on the canvas, the zoom operation resulting in a change of the visualization time range, determining the changed time duration $I_{opt2}$ represented by each pixel of the canvas, identifying the longest time duration $I_{max2}$ of the determined time durations $I_t$ that is smaller than or equal to the changed time duration $I_{opt2}$, in case the changed visualization time range is larger than the visualization time range so that the changed visualization time range comprises one or more time subranges beyond the visualization time range:

selecting, from the set of groups that has been generated for the identified longest time duration $I_{max2}$, a subset of groups whose time intervals span the time subranges, transferring the selected subset of groups from the data source to the internet browser, providing an input set comprising the received tuples of the selected subset of groups and the displayed tuples, in case the changed visualization time range is smaller than the visualization time range, selecting, from the set of groups that has been generated for the identified longest time duration $I_{max2}$, a subset of groups whose time intervals span the changed visualization time range, transferring the selected subset of groups from the data source to the internet browser, providing an input set comprising the received tuples the selected subset of groups, performing, by the internet browser, an M4 aggregation comprising generating, from the input set, a set of consecutive w groups, each group of the w groups comprising tuples covering a time interval having the time duration $I_{opt2}$, determining for each group of the w groups a set of aggregates, the set of aggregates comprising tuples of each group having respectively the minimum value, the maximum value, the smallest timestamp and the highest timestamp, using the updated sets of aggregates for updating the displayed chart.

9. A computer program product comprising a computer-readable storage medium having computer-readable program code embodied therewith, the computer-readable program code executable to:

acquire sensor data v and timestamping t of the sensor data to provide the time series relation T(t, v) by at least one data source, determine a number j of distinct time durations $I_t$;

for each distinct time duration $I_t$ of the determined time durations:

generate, from the time series relation T(t, v, a set of groups $G(T, I_t)$, the set of groups $G(T, I_t)$ comprising consecutive groups $B_{I_t}$, each group of the set of groups $G(T, I_t)$ comprising sensor data that has a timestamp within the time duration $I_t$, for each group of the generated set, determine four values comprising a minimum value, maximum value, first value and last value acquired during the time interval covered by the each group, and providing tuples comprising the four values and associated timestamps, receive a request for visualizing the time series relation T(t, v) from an internet browser, whereby the visualization is to be performed within a canvas area of a browser window of the internet browser, the canvas having a width of w pixels and covering a visualization time range, each pixel of the canvas being representative of a time duration $I_{opt}$, identify the longest time duration $I_{max}$ of the determined time durations $I_t$ that is smaller than or equal to the time duration $I_{opt}$, select, from the set of groups that has been generated for the identified longest time duration $I_{max}$, a subset of groups whose time intervals at least span the visualization time range, transfer the selected subset of groups from the data source to the internet browser, and perform, by the internet browser, an M4 aggregation comprising:

generating, from the received tuples of the selected subset, a set of consecutive w groups, each group of the w groups comprising tuples covering a time interval having the time duration $I_{opt}$, determining for each group of the w groups a set of aggregates, the set of aggregates comprising tuples of the group having respectively the minimum value, the maximum value, the smallest timestamp and the highest timestamp, and displaying the w sets of aggregates on the canvas of the browser window as a chart, wherein each one of the sets of aggregates is displayed in one of pixel columns of the canvas.

10. A computer system comprising:

a memory storing processor executable instructions; and a processor to execute the processor-executable instructions to cause:

acquiring of sensor data v and timestamping t of the sensor data to provide the time series relation T(t, v) by at least one data source, determining a number j of distinct time durations $I_t$, for each distinct time duration $I_t$ of the determined time durations:

generating, from the time series relation T(t, v), a set of groups $G(T, I_t)$, the set of groups $G(T, I_t)$ comprising consecutive groups $B_{I_t,i}$, each group of the set of groups $G(T, I_t)$ comprising sensor data that has a timestamp within the time duration $I_t$, for each group of the generated set determining four values comprising a minimum value, maximum value, first value and last value acquired during the time interval covered by each group, and providing tuples comprising the four values and associated timestamps, receiving a request for visualizing the time series relation T(t, v) from an internet browser, whereby the visualization is to be performed within a canvas area of a browser window of the internet browser, the canvas having a width of w pixels and covering a visualization time range, each pixel of the canvas being representative of a time duration $I_{opt}$, identifying the longest time duration $I_{max}$ of the determined time durations $I_t$ that is smaller than or equal to the time duration $I_{opt}$, selecting, from the set of groups that has been generated for the identified longest time duration $I_{max}$, a subset of groups whose time intervals at least span the visualization time range, transferring the selected subset of groups from the data source to the internet browser, the internet browser being configured for performing an M4 aggregation comprising generating, from the received tuples, a set of consecutive w groups, each group of the w groups comprising tuples covering a time interval having the time duration $I_{opt}$, determining for each group of the w groups a set of aggregates, the set of aggregates comprising tuples of the each group having respectively the minimum value, the maximum value, the smallest timestamp and the highest timestamp, and displaying the w sets of aggregates on the canvas of the browser window as a chart, wherein each one of the sets of aggregates is displayed in one of pixel columns of the canvas.

11. A method of visualizing sensor data of a data source, the method comprising:

sending to the data source a request for visualizing sensor data, whereby the visualization is to be performed within a canvas area of a browser window, the canvas having a width of w pixels and covering a visualization time range, each pixel of the canvas being representative of a time duration $I_{opt}$, receiving from the data source consecutive sets of tuples that each covers a time interval having a time duration $I_t$ ($I_t \leq I_{opt}$), the set of tuples comprising four values and associated timestamps, the four values comprising a minimum value, maximum value, first value and last value acquired during the time interval, performing a M4 aggregation comprising generating, from the received tuples, a set of consecutive w groups, each group of the w groups comprising tuples covering a time interval having the time duration $I_{opt}$, determining for each group of the w groups a set of aggregates, the set of aggregates comprising tuples of each group having respectively the minimum value, the maximum value, the smallest timestamp and the highest timestamp, receiving a zoom operation on the canvas, the zoom operation resulting in a change of the visualization time range, the changed visualization time range is larger than the visualization time range, wherein the changed visualization time range comprises one or more time subranges beyond the visualization time range, determining using the changed visualization time range a changed time duration $I_{opt2}$ represented by each pixel of the canvas, sending to the data source another request for visualizing sensor data, the other request indicating at least the changed time duration $I_{opt2}$, and the time subranges, identifying the longest time duration $I_{max2}$ of the determined time durations $I_t$ that is smaller than or equal to the changed time duration $I_{opt2}$, receiving from the data source tuples of the set of groups that has been generated for the identified longest time duration $I_{max2}$, the received tuples cover time intervals that span the time subranges, performing a M4 aggregation comprising generating, from the received tuples and the displayed tuples, an updated set of consecutive w groups, each group of the w groups comprising tuples covering a time interval having the time duration $I_{opt2}$, determining for each group of the w groups an updated set of aggregates, the set of aggregates comprising tuples of each group having respectively the minimum value, the maximum value, the smallest timestamp and the highest timestamp, using the updated sets of aggregates for updating the displayed chart, and displaying the w sets of aggregates on the canvas of the browser window as a chart, wherein each one of the sets of aggregates is displayed in one of pixel columns of the canvas.

12. The method of claim 11, being performed by an internet browser of a client system, the client system being configured to connect and access data of the data source.

13. The method of claim 12, further comprising, sending to a server computer a sensor data request of types of sensor data, receiving from the server computer a response indicative of types of sensor data, upon receiving a selection of a type of sensor data of the received response, sending a data source request to the server computer for requesting features of one or more data sources of the multiple data sources that provide the selected type of sensor data, receiving from the server computer information indicative of the data source.

14. The method of claim 13, further comprising:

sending a data availability request, receiving a data availability information from the data source, the request for visualizing sensor data being sent upon determining that the data is available using the data availability information.

15. The method of claim 11, further comprising receiving a zoom operation on the canvas, the zoom operation resulting in a change of the visualization time range, the changed visualization time range is smaller than the visualization time range, determining using the changed visualization time range a changed time duration $I_{opt2}$ represented by each pixel of the canvas, sending to the data source another request for visualizing sensor data, the other request indicating at least the changed time duration $I_{opt2}$ and the changed visualization time range, identifying the longest time duration $I_{max2}$ of the determined time durations $I_t$ that is smaller than or equal to the changed time duration $I_{opt2}$, receiving from the data source tuples of the set of groups that has been generated for the identified longest time duration $I_{max2}$, the received tuples cover time intervals that span the changed visualization time range, providing an input set comprising the received tuples, performing an M4 aggregation comprising generating, from the received tuples, a set of consecutive w groups, each group of the w groups comprising tuples covering a time interval having the time duration $I_{opt2}$, determining for each group of the w groups an updated set of aggregates, the set of aggregates comprising tuples of each group having respectively the minimum value, the maximum value, the smallest timestamp and the highest timestamp, using the updated sets of aggregates for updating the displayed chart.

* * * * *